US012726699B2

(12) United States Patent
Jiang et al.

(10) Patent No.: US 12,726,699 B2
(45) Date of Patent: Sep. 1, 2026

(54) CONTACT IMAGE SENSOR

(71) Applicant: WEIHAI HUALING OPTO-ELECTRONICS CO., LTD., Weihai (CN)

(72) Inventors: Li Jiang, Weihai (CN); Xiaowei Han, Weihai (CN); Yonghui Lin, Weihai (CN); Pengfei Dai, Weihai (CN)

(73) Assignee: WEIHAI HUALING OPTO-ELECTRONICS CO., LTD., Weihai (CN)

( * ) Notice: Subject to any disclaimer, the term of this patent is extended or adjusted under 35 U.S.C. 154(b) by 42 days.

(21) Appl. No.: 18/879,697

(22) PCT Filed: Jun. 27, 2023

(86) PCT No.: PCT/CN2023/102895
§ 371 (c)(1),
(2) Date: Dec. 27, 2024

(87) PCT Pub. No.: WO2024/159693
PCT Pub. Date: Aug. 8, 2024

(65) Prior Publication Data

US 2025/0392808 A1 Dec. 25, 2025

(30) Foreign Application Priority Data

Jan. 30, 2023 (CN) ......................... 202310076387.8

(51) Int. Cl.
*H04N 5/335* (2011.01)
*H04N 23/56* (2023.01)
(Continued)

(52) U.S. Cl.
CPC .......... *H04N 23/651* (2023.01); *H04N 23/56* (2023.01); *H04N 23/74* (2023.01)

(58) Field of Classification Search
CPC ..................................................... H04N 1/031
See application file for complete search history.

(56) References Cited

U.S. PATENT DOCUMENTS 12,166,937 B2 * 12/2024 Jiang .................... H04N 1/0318
2013/0057739 A1 3/2013 Lazovsky
2023/0353692 A1 * 11/2023 Jiang ................. H04N 1/02815

FOREIGN PATENT DOCUMENTS

CN 1453995 A 11/2003
CN 109691087 A 4/2019
(Continued)

OTHER PUBLICATIONS

International Search Report dated Oct. 19, 2023 issued in PCT/CN2023/102895.

(Continued)

*Primary Examiner* — Gary C Vieaux
(74) *Attorney, Agent, or Firm* — Scully, Scott, Murphy & Presser, P.C.

(57) ABSTRACT

A contact image sensor is provided, including: a control unit configured to receive output pulses from an encoder, where the control unit includes a comparator configured to compare the output pulses with a preset scanning cycle stored in the register to obtain an illumination control signal; an illumination unit configured to illuminate an object to be detected based on the illumination control signal; a scanning unit configured to scan the object to be detected based on the scanning trigger signal to obtain a scanning signal; a data processing unit configured to process the scanning signal to obtain an initial scanning result; and a data output unit configured to obtain a target scanning result based on the initial scanning result and output the target scanning result based on the output trigger signal.

9 Claims, 4 Drawing Sheets

(51) Int. Cl.

| | |
|---|---|
| ***H04N 23/65*** | (2023.01) |
| ***H04N 23/74*** | (2023.01) |

(56) References Cited

FOREIGN PATENT DOCUMENTS

| | | | |
|---|---|---|---|
| CN | 109740393 | A | 5/2019 |
| CN | 112073592 | A | 12/2020 |
| CN | 112135005 | A | 12/2020 |
| CN | 112437202 | A | 3/2021 |
| CN | 114442861 | A | 5/2022 |
| CN | 116132777 | A | 5/2023 |
| EP | 4 099 674 | A1 | 12/2022 |
| JP | H01155471 | A | 6/1989 |
| JP | H07288658 | A | 10/1995 |
| JP | 2010-283438 | A | 12/2010 |
| JP | 2013-179532 | A | 9/2013 |
| JP | 2013-211656 | A | 10/2013 |
| JP | 2023-521207 | A | 5/2023 |

OTHER PUBLICATIONS

The first office action of counterpart CN application No. 2023100763878 was issued on Feb. 29, 2024.
The second office action of counterpart CN application No. 2023100763878 was issued on Nov. 22, 2024.
Japanese Decision to Grant dated Nov. 25, 2025 received in Japanese Application No. 2025-503003.
Extended Supplementary European Search Report dated Oct. 9, 2025 received in European Application No. 23919258.6.

* cited by examiner

CONTACT IMAGE SENSOR

CROSS-REFERENCE TO RELATED APPLICATION

This application claims priority to Chinese patent application No. 202310076387.8, entitled "Contact Image Sensor", filed on Jan. 30, 2023, the entire content of which is incorporated herein by reference as part or all of this application.

TECHNICAL FIELD

The present disclosure relates to the technical field of sensors, and specifically, to a contact image sensor.

BACKGROUND

In the related art, an image sensor is connected to a conveying mechanism of an object to be detected through an encoder, and the object to be detected is detected based on output pulses of the encoder. However, the image sensor in the related art results in significant power wastage in the working process.

Therefore, in the related art, the technical problem of power wastage when the image sensor scans the object to be detected exists.

There are still no effective solutions for the above problem.

SUMMARY

An embodiment of the present disclosure provides a contact image sensor, so as to at least solve the technical problem of power wastage when an image sensor scans an object to be detected.

According to one aspect of this embodiment of the present disclosure, a contact image sensor is provided, and includes a control unit 11, an illumination unit 12, a scanning unit 13, a data processing unit 14, and a data output unit 15, where the control unit 11 is configured to receive output pulses from an encoder, and the output pulses are determined based on a movement speed of an object to be detected. The control unit 1 includes: a comparator 11_1, a register 11_2, and a timing generation circuit 11_3; the comparator 11_1 is configured to compare the output pulses with a preset scanning cycle stored in the register 11_2 to obtain an illumination control signal; the timing generation circuit 11_3 is configured to generate a scanning trigger signal and determine an output trigger signal based on the output pulses; the illumination unit 12 is configured to illuminate the object to be detected based on the illumination control signal; the scanning unit 13 is configured to scan the object to be detected based on the scanning trigger signal to obtain a scanning signal; the data processing unit 14 is configured to process the scanning signal to obtain an initial scanning result; and the data output unit 15 is configured to obtain a target scanning result based on the initial scanning result and output the target scanning result based on the output trigger signal.

As at least one alternative embodiment, the comparator 11_1 is further configured to compare the output pulses with the preset scanning cycle stored in the register 11_2 in the control unit 11 to obtain a valid scanning cycle and an invalid scanning cycle, and determine the illumination control signal based on the valid scanning cycle and the invalid scanning cycle.

As at least one alternative embodiment, the comparator 11_1 is further configured to determine a first illumination duration within a cycle corresponding to the valid scanning cycle; the comparator 11_1 is also configured to determine a second illumination duration within a cycle corresponding to the invalid scanning cycle; and the comparator 11_1 is also configured to determine the illumination control signal based on the valid scanning cycle, the invalid scanning cycle, the first illumination duration, and the second illumination duration, where the first illumination duration is longer than the second illumination duration.

As at least one alternative embodiment, the illumination unit 12 is also configured to illuminate the object to be detected at a first power within the first illumination duration in the valid scanning cycle; and the illumination unit 12 is further configured to illuminate the object to be detected at a second power within the second illumination duration in the invalid scanning cycle, where the first power is greater than the second power.

As at least one alternative embodiment, the illumination unit 12 performs illumination using a light-emitting diode.

As at least one alternative embodiment, the scanning unit 13 is further configured to receive, based on the scanning trigger signal, an optical signal generated from the object to be detected under illumination of the illumination unit 12, and convert the optical signal into an electrical signal to obtain a scanning signal.

As at least one alternative embodiment, the data output unit 15 further includes: a data output control unit 15_1. The data output control unit 15_1 is configured to determine, among invalid scanning cycles, an invalid scanning cycle immediately preceding a valid scanning cycle as a target cycle; the data output control unit 15_1 is further configured to delete scanning data corresponding to the target cycle from the initial scanning result to obtain the target scanning result; and the data output control unit 15_1 is also configured to output the target scanning result based on the output trigger signal.

As at least one alternative embodiment, the data output unit 15 further includes: a data output control unit 15_1. The data output control unit 15_1 is configured to determine the invalid scanning cycle as a target cycle; the data output control unit 15_1 is further configured to delete scanning data corresponding to the target cycle from the initial scanning result to obtain the target scanning result; and the data output control unit 15_1 is also configured to output the target scanning result based on the output trigger signal.

As at least one alternative embodiment, the data output unit 15 further includes: a cache 15_2, where the cache 15_2 is configured to store the initial scanning result.

In this embodiment of the present disclosure, by using the method of adding the comparator 11_1 and the register 11_2 to the control unit 11 of the image sensor and adding the data output control unit 15_1 to the data output unit 15 and using the comparator 11_1 to compare the output pulses from the encoder with the scanning cycle stored in the register 11_2, when the object to be detected does not move or there is no need to detect the object to be detected, the encoder does not generate the output pulses, and therefore the time when there is no need to illuminate the object to be detected can be obtained according to the above comparison result, thereby obtaining the illumination control signal. The illumination unit 12 in the image sensor is controlled according to the illumination control signal, thereby reducing power wastage. The newly added data output control unit 15_1 may filter from the data obtained through scanning. For example, the data output control unit 15_1 may only output valid data, or may also be configured to control not outputting some data that does not satisfy requirements in the valid data, thereby achieving the technical effects of reducing power wastage when scanning the object to be detected using the image sensor and improving validity of scanning data, and then solving the technical problem of power wastage when scanning the object to be detected through the image sensor.

BRIEF DESCRIPTION OF THE DRAWINGS

The accompanying drawings illustrated herein are used for providing a further understanding of the present disclosure and form a part of this application. Schematic embodiments of the present disclosure and descriptions thereof are used for describing the present disclosure, and do not form improper limitations on the present disclosure. In the accompanying drawings.

DETAILED DESCRIPTION OF THE EMBODIMENTS

Figure 1:
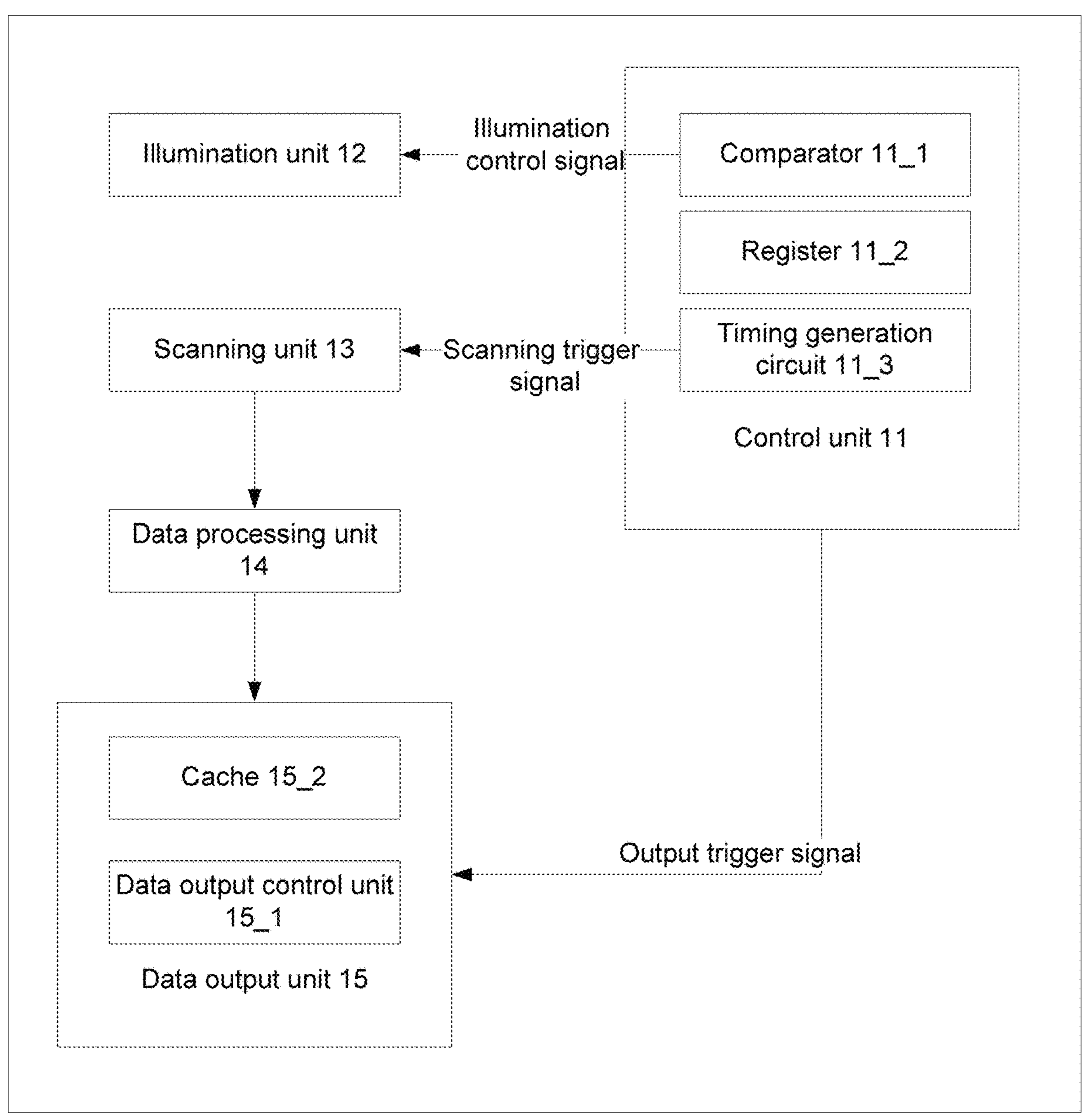
FIG. 1 is a schematic diagram of a contact image sensor according to an embodiment of the present disclosure.

In order to make those skilled in the art better understand solutions of the present disclosure, the technical solutions in the embodiments of the present disclosure are clearly and completely described with reference to the accompanying drawings in the embodiments of the present disclosure as below, and it is apparent that the described embodiments are merely a part rather all embodiments of the present disclosure. Based on the embodiments of the present disclosure, all other embodiments obtained by those of ordinary skill in art without creative work shall fall within the scope of protection of the present disclosure.

It should be noted that the terms such as “first” and “second” of the specification and the claims of the present disclosure, as well as the above accompanying drawings are used to distinguish similar objects but are not necessarily intended to describe specific sequences or precedence orders. It should be understood that such used data is interchangeable where appropriate, such that the embodiments of the present disclosure described herein may be implemented in sequences other than those illustrated or described herein. In addition, the terms “include”, “have”, and any variations thereof are intended to encompass non-exclusive inclusions. For example, a process, a method, a system, a product, or a device including a series of steps or units is not necessarily limited to those explicitly-listed steps or units, but may include other steps or units that are not explicitly listed or inherent to the process, the method, the system, the product, or the device.

In the related art, a contact image sensor has been widely applied to the field of industrial detection. To match a movement speed of an object to be detected in industrial detection, the contact image sensor is typically connected to a conveying mechanism of the object to be detected through an encoder. The contact image sensor matches output pulses of the encoder. Generally, a scanning unit and an illumination unit of the contact image sensor perform line-triggered scanning in a self-propelled mode. A data processing unit transmits, based on the output pulses of the encoder, image information scanned by the scanning unit, thereby forming a 1:1 scan image compared to the object to be detected. However, when the object to be detected is replaced or a certain object to be detected does not need to be detected, there are occasions where the movement speed of the object to be detected is significantly slow, or even the object to be detected is completely stopped for an extended period with the movement speed of 0, and as a result, the encoder does not output pulses for a long time. In this case, the data processing unit of the contact image sensor does not receive the output pulses of the encoder, there is no need to transmit the image information scanned by the scanning unit, but the scanning unit and the illumination unit still perform the line-triggered scanning in the self-propelled mode, and a matched light source system remains illumination, resulting in power wastage (for high-speed detection of an object to be detected with a low grayscale value, particularly bright illumination is required, with some illumination currents exceeding 10 A, leading to substantial power consumption). Meanwhile, the continuous operation of the scanning unit and the illumination unit may cause unfavorable user experience.

Figure 2:
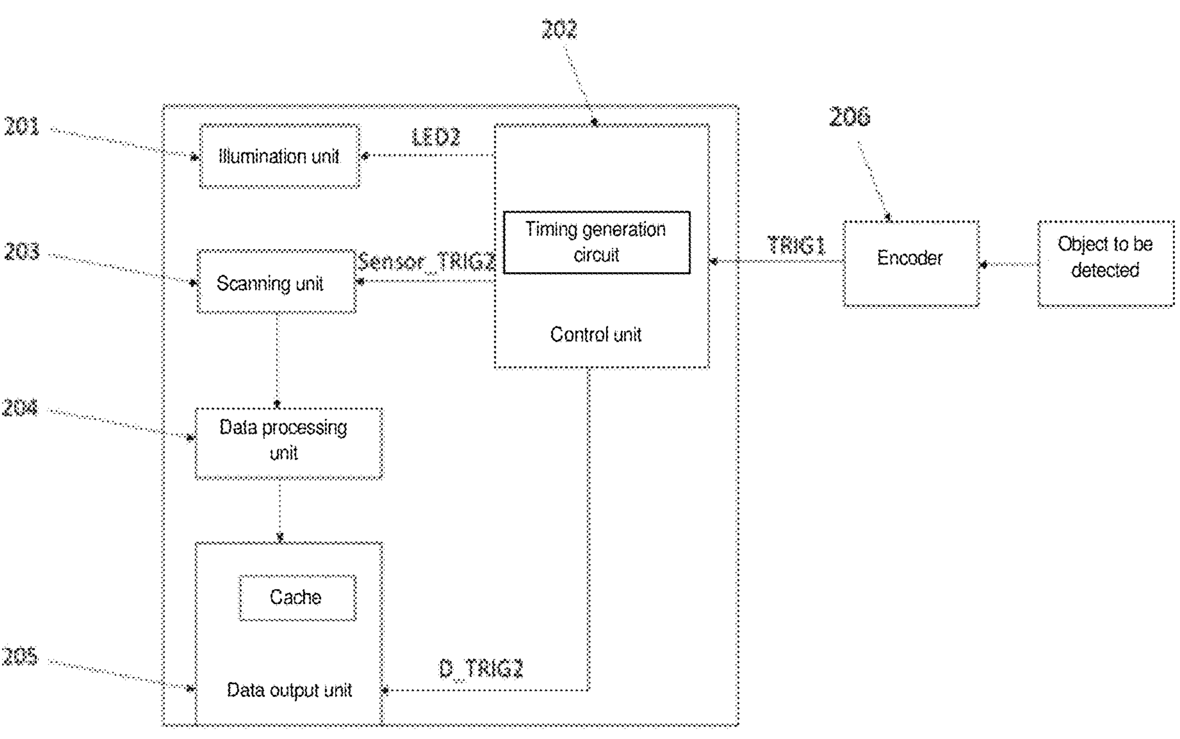
FIG. 2 is a schematic diagram of a contact image sensor provided in the related art.

FIG. 2 is a schematic diagram of a contact image sensor provided in the related art. As shown in FIG. 2, the contact image sensor includes: an illumination unit 201, a control unit 202, a scanning unit 203, a data processing unit 204, and a data output unit 205.

A timing generation circuit in the control unit 202 generates various timing logic signals and a line trigger signal Sensor_TRIG2 required by the scanning unit 203, as to control the scanning unit 203 to perform self-propelled line-triggered scanning of the contact image sensor according to a self-propelled line trigger signal (i.e., a self-propelled cycle) Sensor_TRIG2. The timing generation circuit in the control unit 202 also generates a trigger signal D_TRIG2 used by the output of the data output unit according to a TRIG1 signal of an external motor encoder 206. Meanwhile, the timing generation circuit in the control unit 202 generates an illumination control signal LED2 required by the illumination unit 201. The light emitted by the illumination unit 201 illuminates an object to be detected, and an optical signal is generated from the object to be detected to enter the scanning unit 203. The scanning unit 203 converts the received optical signal into an electrical signal and transmits the electrical signal to the data processing unit 204. The data processing unit 204 processes data and then transmits the data to the data output unit 205. The data output unit 205 outputs the data according to the D_TRIG2 signal generated by the control unit 202, and transmits the data to an upper computer or an industrial personal computer. The above description is the entire scanning and data processing process of the contact image sensor.

Figure 3:
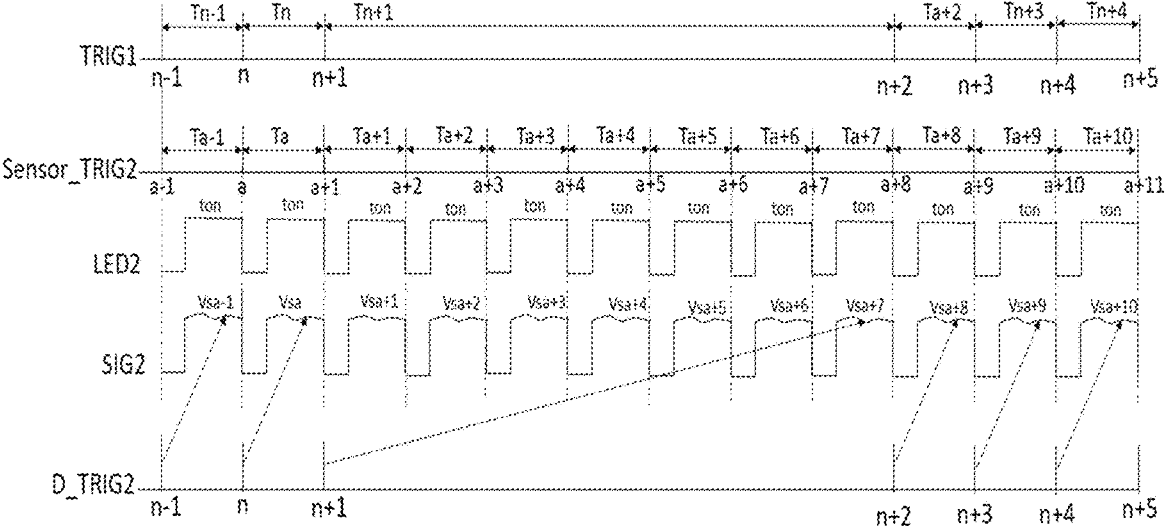
FIG. 3 is a schematic diagram of timing control of the contact image sensor provided in the related art.

FIG. 3 is a schematic diagram of timing control of the contact image sensor provided in the related art. As shown in FIG. 3, the timing generation circuit in the control unit 202 generates the various timing logic signals and the line trigger signal Sensor_TRIG2 required by the scanning unit 203, so as to control the scanning unit 203 to perform self-propelled line-triggered scanning of the contact image sensor according to the self-propelled line trigger signal (i.e., the self-propelled cycle) Sensor_TRIG2. The timing generation circuit in the control unit 202 also generates the trigger signal D_TRIG2 used by the output of the data output unit according to the TRIG1 signal of the external motor encoder 206. Meanwhile, the timing generation circuit in the control unit 202 generates the illumination control signal LED2 required by the illumination unit 201. As seen in FIG. 3, during each line cycle (Ta−1, Ta, Ta+1, Ta+2, Ta+3, Ta+4, Ta+5, Ta+6, Ta+7, Ta+8, Ta+9, Ta+10, . . . ) of the scanning unit, the illumination time of the illumination unit 201 is ton. The light emitted by the illumination unit 201 illuminates the object to be detected, and the optical signal is generated from the object to be detected to enter the scanning unit 203. The scanning unit 203 converts the received optical signal into the electrical signal and transmits the electrical signal to the data processing unit 204. The data processing unit 204 processes data and then transmits the data to the data output unit 205. Among self-propelled line data SIG (Vsa−1, Vsa, Vsa+1, Vsa+2, Vsa+3, Vsa+4, Vsa+5, Vsa+6, Vsa+7, Vsa+8, Vsa+9, and Vsa+10), the data output unit 205 outputs the data Vsa−1, Vsa, Vsa+7, Vsa+8, Vsa+9, and Vsa+10 according to the D_TRIG2 signal generated by the control unit 202 (valid data output trigger signals in the D_TRIG2 are n−1, n, n+1, n+2, n+3, and n+4, respectively corresponding to data signals Vsa−1, Vsa, Vsa+7, Vsa+8, Vsa+9, and Vsa+10), and then transmits the data to the upper computer or the industrial personal computer. During the scanning operation of the contact image sensor, illumination by the illumination unit 1 is only meaningful during the scanning periods corresponding to the data Vsa−1, Vsa, Vsa+7, Vsa+8, Vsa+9, and Vsa+10, while illumination by the illumination unit 1 during the scanning periods corresponding to the data Vsa+2, Vsa+3, Vsa+4, Vsa+5, and Vsa+6 is ineffective, resulting in significant power wastage and unfavorable user experience. Therefore, it is necessary to develop a contact image sensor that saves power and provides good user experience.

For the above technical problems, an embodiment of the present disclosure provides a contact image sensor. FIG. 1 is a schematic diagram of a contact image sensor according to an embodiment of the present disclosure. As shown in FIG. 1, the contact image sensor includes: a control unit 11, an illumination unit 12, a scanning unit 13, a data processing unit 14, and a data output unit 15. The following is a description of the image sensor.

The control unit 11 is configured to receive output pulses from an encoder, where the output pulses are determined based on the movement speed of an object to be detected. The control unit 11 includes a comparator 11_1, a register 11_2, and a timing generation circuit 11_3.

The comparator 11_1 is configured to compare the output pulses with a preset scanning cycle stored in the register 11_2 to obtain an illumination control signal.

The timing generation circuit 11_3 is configured to generate a scanning trigger signal and determine an output trigger signal based on the output pulses.

The illumination unit 12 is configured to illuminate the object to be detected based on the illumination control signal.

The scanning unit 13 is configured to scan the object to be detected based on the scanning trigger signal to obtain a scanning signal.

The data processing unit 14 is configured to process the scanning signal to obtain an initial scanning result.

The data output unit 15 is configured to obtain a target scanning result based on the initial scanning result and output the target scanning result based on the output trigger signal.

By using the method of adding the comparator 11_1 and the register 11_2 to the control unit 11 of the image sensor and adding the data output control unit 15_1 to the data output unit 15 and using the comparator 11_1 to compare the output pulses from the encoder with the scanning cycle stored in the register 11_2, when the object to be detected does not move or there is no need to detect the object to be detected, the encoder does not generate the output pulses, and therefore the time when there is no need to illuminate the object to be detected can be obtained according to the above comparison result, thereby obtaining the illumination control signal. The illumination unit 12 in the image sensor is controlled according to the illumination control signal, thereby reducing power wastage, achieving the technical effects of reducing power wastage when scanning the object to be detected using the image sensor and improving validity of scanning data, and then solving the technical problem of power wastage when scanning the object to be detected through the image sensor.

As an optional embodiment, the comparator 11_1 is further configured to compare the output pulses with the preset scanning cycle stored in the register 11_2 in the control unit 11 to obtain a valid scanning cycle and an invalid scanning cycle, and determine the illumination control signal based on the valid scanning cycle and the invalid scanning cycle.

The preset scanning cycle in the register 11_2 may be correspondingly adjusted according to actual application scenarios. For example, the preset scanning cycle may be set and adjusted based on a pulse cycle outputted by the encoder when the object to be detected moves at a normal speed.

When comparing the output pulses with the preset scanning cycle, the comparator 11_1 determines, according to the comparison result, the valid scanning cycle and the invalid scanning cycle corresponding to the output pulses. For example, the valid scanning cycle may be determined based on the output pulses generated by the encoder when the movement speed of the object to be detected is higher than a speed threshold. The comparator 11_1 may determine the invalid scanning cycle based on the output pulses generated by the encoder when the movement speed of the object to be detected is not higher than the speed threshold. Therefore, the comparator 11_1 may determine the time when the object to be detected requires normal illumination and the time when the object to be detected does not need continuous illumination by comparing the output pulses with the preset scanning cycle, thereby determining the illumination control signal.

As an optional embodiment, the comparator 11_1 is further configured to determine a first illumination duration within a cycle corresponding to the valid scanning cycle; the comparator 11_1 is also configured to determine a second illumination duration within a cycle corresponding to the invalid scanning cycle; and the comparator 11_1 is also configured to determine the illumination control signal based on the valid scanning cycle, the invalid scanning cycle, the first illumination duration, and the second illumination duration, where the first illumination duration is longer than the second illumination duration.

When determining the illumination control signal based on the valid scanning cycle and the invalid scanning cycle, the comparator 11_1 may also adjust illumination control details corresponding to the illumination control signal, such as controlling the illumination duration within the valid scanning cycle and the illumination duration within the invalid scanning cycle. For the valid scanning cycle, the movement speed of the object to be detected is higher than the speed threshold, which indicates that the object to be detected needs to be scanned, and requires sufficient illumination, and therefore the illumination control signal corresponding to the valid scanning cycle may be used to control the illumination unit 12 to perform illumination for the first illumination duration, thereby ensuring sufficient illumination during scanning the object to be detected, and obtaining an accurate and effective scanning result. For the invalid scanning cycle, the movement speed of the object to be detected is not higher than the speed threshold, which indicates that the object to be detected is in a stationary or slow movement state, and does not need to be scanned or illuminated, and therefore the illumination control signal corresponding to the invalid scanning cycle may be used to control the illumination unit 12 to perform illumination for the second illumination duration, thereby shortening the illumination time when there is no need to scan the object to be detected, and then achieving the technical effect of reducing power wastage.

It should be noted that the first illumination duration and the second illumination duration may be durations within one single illumination cycle. For example, one illumination cycle may be set, and within the one illumination cycle, illumination is only performed within the first illumination duration/the second illumination duration, while no illumination is performed during the rest of the illumination cycle T.

As an optional embodiment, the illumination unit 12 is also configured to illuminate the object to be detected at a first power within the first illumination duration in the valid scanning cycle; and the illumination unit 12 is further configured to illuminate the object to be detected at a second power within the second illumination duration in the invalid scanning cycle, where the first power is greater than the second power. After receiving the illumination control signal from the comparator 11_1, the illumination unit 12 may adjust the power used during illumination according to the illumination control signal. For example, normal illumination is needed within the first illumination duration, and therefore the illumination unit 12 may perform illumination according to the first power which is higher, thereby ensuring an illumination effect. However, within the second illumination duration, illumination is not needed, or illumination intensity needs to be reduced, and therefore the illumination unit 12 may perform illumination according to the second power which is lower, thereby saving power resources.

It should be noted that when generating the illumination control signal, the comparator 11_1 may also directly utilize the illumination control signal to control the illumination unit 12 not to illuminate the object to be detected in the invalid scanning cycle, that is, the second illumination duration may be set to zero, and/or the second power is set to zero.

As an optional embodiment, the illumination unit 12 performs illumination using a light-emitting diode.

As an optional embodiment, the scanning unit 13 is further configured to receive, based on the scanning trigger signal, an optical signal generated from the object to be detected under illumination of the illumination unit 12, and convert the optical signal into an electrical signal to obtain a scanning signal. The light emitted by the illumination unit 12 illuminates the object to be detected, and the optical signal generated from the object to be detected enters into the scanning unit 13. The scanning unit 13 converts the received optical signal into the electrical signal to obtain the scanning signal, and transmits the scanning signal to the data processing unit 14. Then, the data processing unit 14 continues to perform operations such as data processing.

As an optional embodiment, the data output unit 15 further includes: a data output control unit 15_1. The data output control unit 15_1 is configured to determine, among invalid scanning cycles, an invalid scanning cycle immediately preceding a valid scanning cycle as a target cycle; the data output control unit 15_1 is further configured to delete scanning data corresponding to the target cycle from the initial scanning result to obtain the target scanning result; and the data output control unit 15_1 is also configured to output the target scanning result based on the output trigger signal. After the illumination control signal is generated through the comparator 11_1 and the illumination unit 12 adjusts the illumination based on the illumination control signal, invalid data may exist in the scanning signal obtained by the scanning unit 13, and therefore in this embodiment, by newly adding the data output control unit 15_1 to the data output unit 15 of the image sensor, these invalid data may be filtered out.

For example, at the junction between the invalid scanning cycle and the valid scanning cycle, that is, the current cycle is the invalid scanning cycle while the next cycle is the valid scanning cycle, due to the reduced illumination duration and/or power for the object to be detected in the invalid scanning cycle, one line of data in the valid data obtained through scanning may be too low to use, and therefore in this embodiment, by deleting the data corresponding to the cycle, the data accuracy and usability of the scanning result are improved.

As an optional embodiment, the data output unit 15 further includes: a data output control unit 15_1. The data output control unit 15_1 is configured to determine the invalid scanning cycle as a target cycle; the data output control unit 15_1 is further configured to delete scanning data corresponding to the target cycle from the initial scanning result to obtain the target scanning result; and the data output control unit 15_1 is also configured to output the target scanning result based on the output trigger signal. Apart from only deleting the data corresponding to the cycle at the junction between the valid scanning cycle and the invalid scanning cycle as mentioned above, in this embodiment, all data corresponding to the invalid scanning cycle may also be deleted, and only the scanning result corresponding to the valid scanning cycle is outputted.

As an optional embodiment, the data output unit 15 further includes: a cache 15_2, where the cache 15_2 is configured to store the initial scanning result. The cache 15_2 in this embodiment stores the scanning result not subjected to deletion processing, namely the initial scanning result, thereby facilitating subsequent data retrieval, inspection, or analysis.

Based on the above embodiments and the optional embodiments, the present disclosure provides an optional contact image sensor, which is described below.

Figure 4:
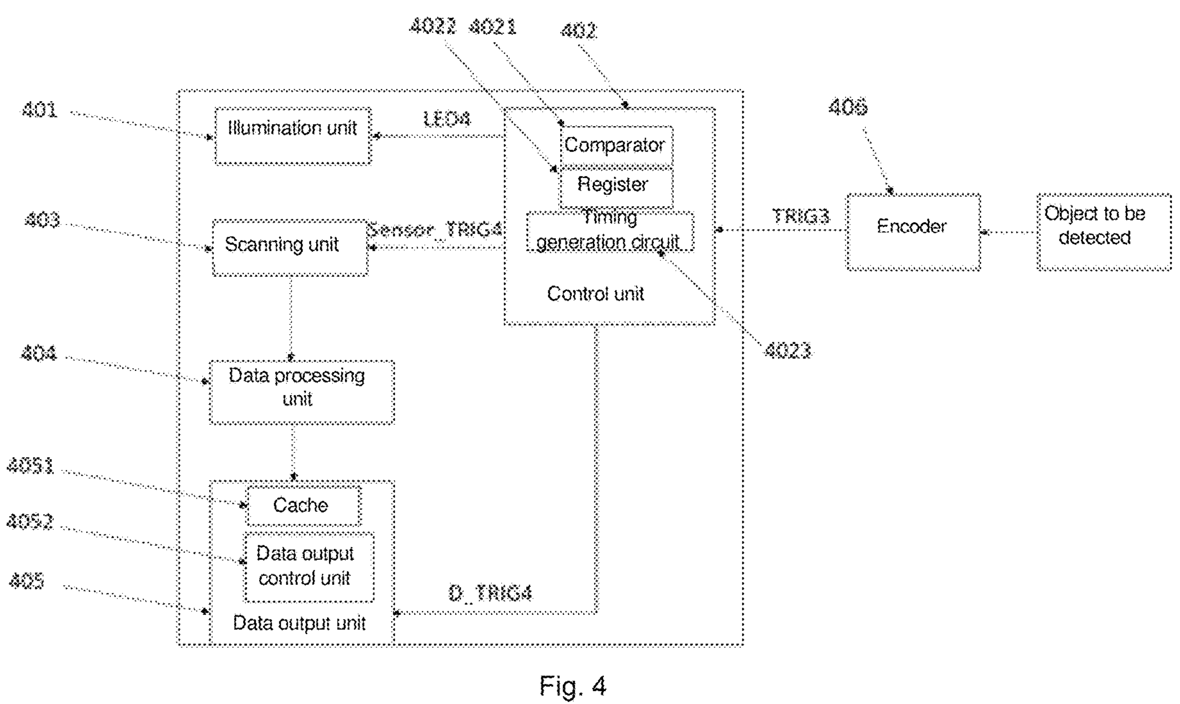
FIG. 4 is a schematic diagram of an optional contact image sensor according to the present disclosure.

FIG. 4 is a schematic diagram of an optional contact image sensor according to the present disclosure. As shown in FIG. 4, the image sensor includes an illumination unit 401, a control unit 402, a scanning unit 403, a data processing unit 404, and a data output unit 405.

The control unit 402 includes a comparator 4021, a register 4022, and a timing generation circuit 4023, and the data output unit 405 includes a cache 4051 and a data output control unit 4052. A fixed time T is stored in the register 4022, and is configured to be compared with the line cycle signal TRIG3 of the encoder in the comparator 4021. The timing generation circuit in the control unit 402 generates various timing logic signals and a line trigger signal Sensor_TRIG4 required by the scanning unit 403, so as to control the scanning unit 403 to perform self-propelled line-triggered scanning of the contact image sensor according to a self-propelled line trigger signal (i.e., a self-propelled cycle) Sensor_TRIG4. The timing generation circuit in the control unit 402 also generates a trigger signal D_TRIG4 used by the output of the data output unit according to a TRIG3 signal of an external motor encoder 406. Meanwhile, the register 4022 in the timing generation circuit in the control unit 402 stores the fixed time T, which is compared with the line cycle signal TRIG3 of the encoder in the comparator 4021, thereby generating an illumination control signal LED4 required by the illumination unit 401, the illumination control signal LED4 controls the illumination unit 401 to emit bright or dim light. That is, the illumination unit 401 normally emits light in the valid scanning line cycle, and in the invalid scanning line cycle, the illumination unit has shortened illumination time and emits dim light. The light emitted by the illumination unit 401 illuminates the object to be detected, and an optical signal is generated from the object to be detected to enter into the scanning unit 403. The scanning unit 403 converts the received optical signal into an electrical signal and transmits the electrical signal to the data processing unit 404. The data processing unit 404 processes data and then transmits the data to the data output unit 405. The cache 4051 in the data output unit 405 temporarily stores self-propelled line data. The data output control unit 4052 then outputs the data according to the D_TRIG4 signal generated by the control unit 402, and transmits the data to the upper computer or the industrial personal computer.

An actual working condition of the contact image sensor is described below.

(1) Application 1

The control unit 402 includes the comparator 4021, the register 4022, and the timing generation circuit 4023. The timing generation circuit 4023 in the control unit 402 generates the various timing logic signals and the self-propelled line trigger signal Sensor_TRIG4 required by the scanning unit 403, so as to control the scanning unit 403 to perform self-propelled line-triggered scanning of the contact image sensor according to the self-propelled line trigger signal (i.e., the self-propelled cycle) Sensor_TRIG4. The register 4022 stores the fixed time T, the fixed time T is used to be compared with the line cycle signal TRIG3 of the encoder in the comparator 4021, thereby generating the illumination control signal LED4 required by the illumination unit 401, the illumination control signal LED4 controls the illumination unit 401 to emit the bright or dim light, that is, the illumination unit 401 normally emits light in the valid scanning line cycle, and in the invalid scanning line cycle, the illumination unit has shortened illumination time and emits dim light.

Figure 5:
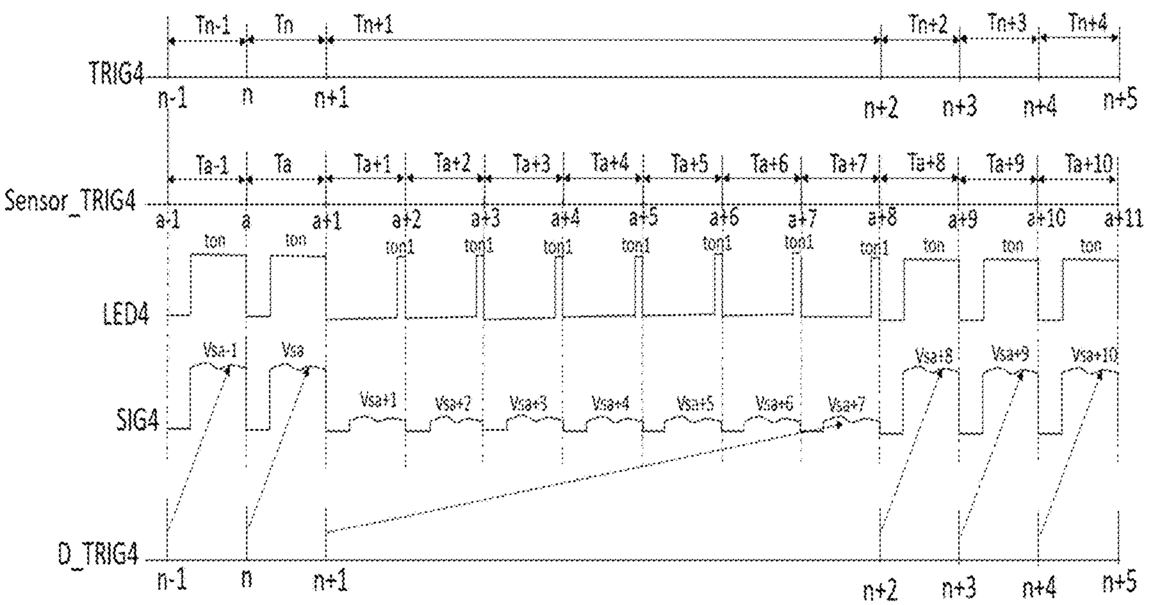
FIG. 5 is a first timing control diagram provided according to an optional contact image sensor in the present disclosure.

FIG. 5 is a first timing control diagram provided according to an optional contact image sensor in the present disclosure. As shown in FIG. 5, after comparison, based on the illumination control signal LED4, within the time Tn−1, Tn, Tn+2, Tn+3, and Tn+4 of the line cycle signal TRIG3 of the encoder, the illumination time in the LED4 is ton. Within the time Tn+1 of the TRIG3, the illumination time in the LED4 is ton1, and the illumination time ton 1 is much shorter than the illumination time ton, thereby greatly saving illumination power. The timing generation circuit in the control unit 402 also generates the trigger signal D_TRIG4 used by the output of the data output unit according to the TRIG3 signal of the external motor encoder 406. During each line cycle (Ta−1, Ta, Ta+1, Ta+2, Ta+3, Ta+4, Ta+5, Ta+6, Ta+7, Ta+8, Ta+9, Ta+10, . . . ) of the scanning unit, the illumination control signal LED4 controls the illumination unit 401 to emit light according to a timing sequence. The light emitted by the illumination unit 401 illuminates the object to be detected, and the optical signal generated from the object to be detected enters into the scanning unit 403. The scanning unit 403 converts the received optical signal into the electrical signal and transmits the electrical signal to the data processing unit 404. The data processing unit 404 processes data and then transmits the data to the data output unit 405. The cache 4051 in the data output unit 405 temporarily stores the self-propelled line data SIG (Vsa−1, Vsa, Vsa+1, Vsa+2, Vsa+3, Vsa+4, Vsa+5, Vsa+6, Vsa+7, Vsa+8, Vsa+9, and Vsa+10), the data output control unit 4052 outputs the data Vsa−1, Vsa, Vsa+7, Vsa+8, Vsa+9, and Vsa+10 according to the D_TRIG4 signal generated by the control unit 402 (valid data output trigger signals in the D_TRIG4 are n−1, n, n+1, n+2, n+3, and n+4, respectively corresponding to data signals Vsa−1, Vsa, Vsa+7, Vsa+8, Vsa+9, and Vsa+10), and then transmits the data to the upper computer or the industrial personal computer. During the scanning operation of the contact image sensor, illumination by the illumination unit 1 is only meaningful during the scanning periods of the data Vsa−1, Vsa, Vsa+7, Vsa+8, Vsa+9, and Vsa+10, while illumination by the illumination unit 1 during the scanning periods of Vsa+2, Vsa+3, Vsa+4, Vsa+5, and Vsa+6 is ineffective. During the periods, the illumination time of the illumination unit within each line cycle is ton1, which is much shorter than normal illumination time, thereby greatly saving illumination power. The light is dim, bringing good experience to customers.

(2) Application 2

In Application 1, after illumination is performed according to the illumination control signal LED4, the illumination time of one line of data Vsa+7 in a valid data signal is ton1, which is shorter than normal illumination time ton, and as a result, one line of data in the valid data is lower, affecting usage. Therefore, in Application 2, the data Vsa+7 may be not output under the control of the data output control unit 4052 in the data output unit 405.

The control unit 402 includes the comparator 4021, the register 4022, and the timing generation circuit 4023. The timing generation circuit 4023 in the control unit 402 generates the various timing logic signals and the self-propelled line trigger signal Sensor_TRIG4 required by the scanning unit 403, so as to control the scanning unit 403 to perform self-propelled line-triggered scanning of the contact image sensor according to the self-propelled line trigger signal (i.e., the self-propelled cycle) Sensor_TRIG4. The register 4022 stores the fixed time T, the fixed time T is used to be compared with the line cycle signal TRIG3 of the encoder in the comparator 4021, thereby generating the illumination control signal LED4 required by the illumination unit 401, the illumination control signal LED4 is used to control the illumination unit 401 to emit the bright or dim light, that is, the illumination unit 401 normally emits light in the valid scanning line cycle, and in the invalid scanning line cycle, the illumination unit has shortened illumination time and emits dim light.

Figure 6:
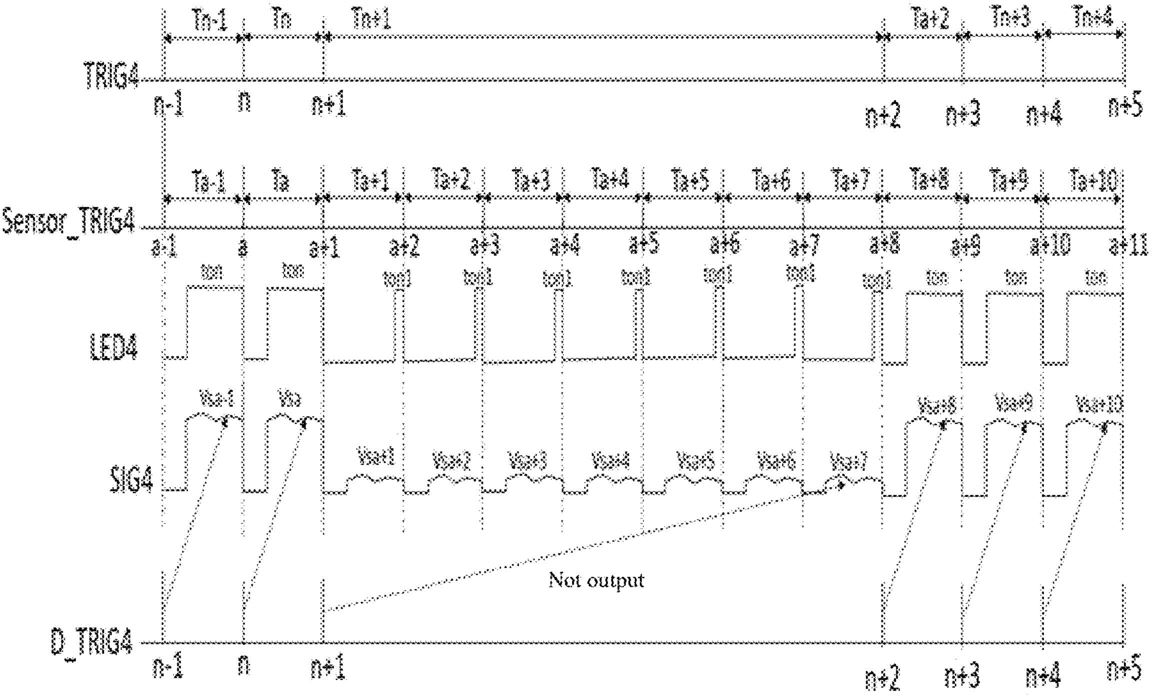
FIG. 6 is a second timing control diagram provided according to an optional contact image sensor in the present disclosure.

FIG. 6 is a second timing control diagram provided according to an optional contact image sensor in the present disclosure. As shown in FIG. 6, after comparison, based on the illumination control signal LED4, within the time Tn−1, Tn, Tn+2, Tn+3, and Tn+4 of the line cycle signal TRIG3 of the encoder, the illumination time in the LED4 is ton. Within the time Tn+1 of the TRIG3, the illumination time in the LED4 is ton1, the illumination time ton 1 is much shorter than the illumination time ton, thereby greatly saving illumination power. The timing generation circuit in the control unit 402 also generates the trigger signal D_TRIG4 used by the output of the data output unit according to the TRIG3 signal of the external motor encoder 406. During each line cycle (Ta−1, Ta, Ta+1, Ta+2, Ta+3, Ta+4, Ta+5, Ta+6, Ta+7, Ta+8, Ta+9, Ta+10, . . . ) of the scanning unit, the illumination control signal LED4 is used to control the illumination unit 401 to emit light according to a timing sequence. The light emitted by the illumination unit 401 illuminates the object to be detected, and the optical signal generated from the object to be detected enters into the scanning unit 403. The scanning unit 403 converts the received optical signal into the electrical signal and transmits the electrical signal to the data processing unit 404. The data processing unit 404 processes data and then transmits the data to the data output unit 405. The cache 4051 in the data output unit 405 temporarily stores the self-propelled line data SIG (Vsa−1, Vsa, Vsa+1, Vsa+2, Vsa+3, Vsa+4, Vsa+5, Vsa+6, Vsa+7, Vsa+8, Vsa+9, and Vsa+10), the data output control unit 4052 outputs the data Vsa−1, Vsa, Vsa+8, Vsa+9, and Vsa+10 according to the D_TRIG4 signal generated by the control unit 402, valid data output trigger signals in the D_TRIG4 are n−1, n, n+1, n+2, n+3, and n+4, respectively corresponding to data signals Vsa−1, Vsa, Vsa+7, Vsa+8, Vsa+9, and Vsa+10, but the Vsa+7 is not output by the data output under the control of the data output control unit 4052, and the data at the illumination time ton 1 is not outputted while only the data at the normal illumination time ton is outputted. During the scanning operation of the contact image sensor, illumination by the illumination unit 1 is only meaningful during the scanning periods of the data Vsa−1, Vsa, Vsa+8, Vsa+9, and Vsa+10, while illumination by the illumination unit 1 during the scanning periods of Vsa+2, Vsa+3, Vsa+4, Vsa+5, Vsa+6, and Vsa+7 is ineffective. During the periods, the illumination time of the illumination unit within each line cycle is ton1, which is much shorter than the normal illumination time, thereby greatly saving illumination power. The light is dim, bringing good experience to the customers.

The serial numbers of the above embodiments of the present disclosure are for descriptive purposes only and do not represent the superiority or inferiority of the embodiments.

In the above embodiments of the present disclosure, the embodiments are described with respective focuses. For a part that is not described in detail in an embodiment, reference may be made to related descriptions in other embodiments.

In the several embodiments provided in this application, it should be understood that the disclosed technical content may be implemented in other manners. The apparatus embodiments described above are merely illustrative, such as the unit division which is merely a logical function division, and during practical implementation, there may be additional division manners. For example, a plurality of units or components may be combined or integrated into another system, or some features may be ignored or not executed. In addition, shown or discussed mutual coupling or direct coupling or communication connection may be realized through some interfaces, and unit or module indirect coupling or communication connection may be in an electrical form or other forms.

The units described as separate components may or may not be physically separated, and components displayed as units may or may not be physical units, that is, may be located in one position, or may be distributed over a plurality of units. Some or all of the units may be selected according to actual needs to achieve the objectives of the solutions of the embodiments.

In addition, various functional units in the embodiments of the present disclosure may be integrated into one processing unit, each of the units may exist alone physically, or two or more units may be integrated into one unit. The above integrated unit may be implemented in the form of hardware or a software functional unit.

If the integrated unit is implemented in the form of the software functional unit and sold or used as an independent product, the integrated unit may be stored in a computer-readable storage medium. Based on the understanding, the technical solutions of the present disclosure essentially or parts making contribution to the prior art or all or part of the technical solutions may be embodied in the form of a software product. The computer software product is stored in a storage medium and includes a plurality of instructions to allow a computer device (e.g., a personal computer, a server, or a network device) to perform all or part of the steps of the methods in the embodiments of the present disclosure. The aforementioned storage medium includes a U disk, a read-only memory (ROM), a random access memory (RAM), a mobile hard drive, a magnetic disk, an optical disk, or other media capable of storing program code.

The above contents are merely preferred implementations of the present disclosure. It should be noted that a plurality of improvements and refinements may also be made by those of ordinary skill in the art without departing from the principle of the present disclosure, and these improvements and refinements should be regarded as within the scope of protection of the present disclosure.

INDUSTRIAL APPLICABILITY

The contact image sensor provided in this embodiment of the present disclosure may be applied to the technical field of sensors. In the field of the present disclosure, the control unit (11) is used and configured to receive output pulses from an encoder, where the output pulses are determined based on a movement speed of an object to be detected; the control unit (11) includes: a comparator (11_1), a register (11_2), and a timing generation circuit (11_3); the comparator (11_1) is configured to compare the output pulses with a preset scanning cycle stored in the register (11_2) to obtain an illumination control signal; the timing generation circuit (11_3) is configured to generate a scanning trigger signal and determine an output trigger signal based on the output pulses; the illumination unit (12) is configured to illuminate the object to be detected based on the illumination control signal; the scanning unit (13) is configured to scan the object to be detected based on the scanning trigger signal to obtain a scanning signal; the data processing unit (14) is configured to process the scanning signal to obtain an initial scanning result; and the data output unit (15) is configured to obtain a target scanning result based on the initial scanning result and output the target scanning result based on the output trigger signal. The technical effects that when the object to be detected is scanned using the image sensor, power wastage is reduced, and validity of scanning data is improved are achieved.

What is claimed is:

1. A contact image sensor, comprising: a control unit, an illumination unit, a scanning unit, a data processing unit, and a data output unit, wherein the control unit is configured to receive output pulses from an encoder, wherein the output pulses are determined based on a movement speed of an object to be detected, and the control unit comprises a comparator, a register, and a timing generation circuit;

the comparator is configured to compare the output pulses with a preset scanning cycle stored in the register to obtain an illumination control signal;

the timing generation circuit is configured to generate a scanning trigger signal and determine an output trigger signal based on the output pulses;

the illumination unit is configured to illuminate the object to be detected based on the illumination control signal;

the scanning unit is configured to scan the object to be detected based on the scanning trigger signal to obtain a scanning signal;

the data processing unit is configured to process the scanning signal to obtain an initial scanning result; and the data output unit is configured to obtain a target scanning result based on the initial scanning result, and output the target scanning result based on the output trigger signal.

2. The image sensor as claimed in claim 1, wherein the comparator is further configured to compare the output pulses with the preset scanning cycle stored in the register in the control unit to obtain a valid scanning cycle and an invalid scanning cycle, and determine the illumination control signal based on the valid scanning cycle and the invalid scanning cycle.

3. The image sensor as claimed in claim 2, wherein the comparator is further configured to determine a first illumination duration within a cycle corresponding to the valid scanning cycle;

the comparator is also configured to determine a second illumination duration within a cycle corresponding to the invalid scanning cycle; and the comparator is also configured to determine the illumination control signal based on the valid scanning cycle, the invalid scanning cycle, the first illumination duration, and the second illumination duration, wherein the first illumination duration is longer than the second illumination duration.

4. The image sensor as claimed in claim 3, wherein the illumination unit is also configured to illuminate the object to be detected at a first power within the first illumination duration in the valid scanning cycle; and the illumination unit is further configured to illuminate the object to be detected at a second power within the second illumination duration in the invalid scanning cycle, wherein the first power is greater than the second power.

5. The image sensor as claimed in claim 2, wherein the data output unit further comprises: a data output control unit, wherein the data output control unit is configured to determine, among the invalid scanning cycles, an invalid scanning cycle immediately preceding a valid scanning cycle as a target cycle the data output control unit is further configured to delete scanning data corresponding to the target cycle from the initial scanning result to obtain the target scanning result; and the data output control unit is also configured to output the target scanning result based on the output trigger signal.

6. The image sensor as claimed in claim 2, wherein the data output unit further comprises: a data output control unit, wherein the data output control unit is configured to determine the invalid scanning cycle as a target cycle;

the data output control unit is further configured to delete scanning data corresponding to the target cycle from the initial scanning result to obtain the target scanning result; and the data output control unit is also configured to output the target scanning result based on the output trigger signal.

7. The image sensor as claimed in claim 1, wherein the illumination unit performs illumination using a light-emitting diode.

8. The image sensor as claimed in claim 1, wherein the scanning unit is further configured to receive, based on the scanning trigger signal, an optical signal generated from the object to be detected under illumination of the illumination unit, and convert the optical signal into an electrical signal to obtain the scanning signal.

9. The image sensor as claimed in claim 1, wherein the data output unit further comprises: a cache, wherein the cache is configured to store the initial scanning result.

* * * * *